(12) United States Patent
Ito et al.

(10) Patent No.: US 10,936,757 B2
(45) Date of Patent: Mar. 2, 2021

(54) REGISTRATION DESTINATION DETERMINATION DEVICE, SEARCHABLE ENCRYPTION SYSTEM, DESTINATION DETERMINATION METHOD, AND COMPUTER READABLE MEDIUM

(71) Applicant: MITSUBISHI ELECTRIC CORPORATION, Tokyo (JP)

(72) Inventors: Takashi Ito, Tokyo (JP); Nori Matsuda, Tokyo (JP); Mitsuhiro Hattori, Tokyo (JP); Yoichi Shibata, Tokyo (JP); Takumi Mori, Tokyo (JP); Takato Hirano, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 109 days.

(21) Appl. No.: 16/091,690

(22) PCT Filed: May 27, 2016

(86) PCT No.: PCT/JP2016/065743
§ 371 (c)(1),
(2) Date: Oct. 5, 2018

(87) PCT Pub. No.: WO2017/203698
PCT Pub. Date: Nov. 30, 2017

(65) Prior Publication Data
US 2019/0163934 A1    May 30, 2019

(51) Int. Cl.
*H04L 29/06* (2006.01)
*G06F 21/75* (2013.01)
(Continued)

(52) U.S. Cl.
CPC .............. *G06F 21/75* (2013.01); *G06F 16/00* (2019.01); *G06F 16/24* (2019.01); *G06F 17/18* (2013.01);
(Continued)

(58) Field of Classification Search
CPC ...................................................... G06F 21/75
See application file for complete search history.

(56) References Cited

U.S. PATENT DOCUMENTS

2005/0256865 A1* 11/2005 Ma ........................ G06F 16/951
2009/0100033 A1*  4/2009 Kim ..................... G06F 21/6227
(Continued)

FOREIGN PATENT DOCUMENTS

JP       2009-181546 A       8/2009
JP       2012-133320 A       7/2012
(Continued)

OTHER PUBLICATIONS

Boneh et al. "Public Key Encryption with keyword Search", Eurocrypt 2004, LNCS 3027, Interlaken, Switzerland, May 2004, pp. 506-522.
International Search Report, issued in PCT/JP2016/065743, PCT/ISA/210, dated Aug. 2, 2016.

*Primary Examiner* — Taghi T Arani
*Assistant Examiner* — Lin Chang
(74) *Attorney, Agent, or Firm* — Birch, Stewart, Kolasch & Birch, LLP

(57) ABSTRACT

A registration destination determination device (50) determines which data management device, among a plurality of data management devices (20A, 20B), is to manage registration data, such that, with a data type constituting the registration data as a target type, an appearance frequency distribution of values set for the target type of the registration data managed by each of the plurality of data management devices (20A, 20B) is different from an appearance frequency distribution of values set for the target type of the
(Continued)

registration data managed by the whole of the plurality of data management devices (20A, 20B).

10 Claims, 19 Drawing Sheets

(51) Int. Cl.
*G06F 21/62* (2013.01)
*H04L 9/30* (2006.01)
*G06F 16/00* (2019.01)
*H04L 9/00* (2006.01)
*G06F 16/24* (2019.01)
*G06F 17/18* (2006.01)
*G06F 21/60* (2013.01)

(52) U.S. Cl.
CPC ............ *G06F 21/602* (2013.01); *G06F 21/62* (2013.01); *H04L 9/002* (2013.01); *H04L 9/30* (2013.01); *H04L 63/0414* (2013.01)

(56) References Cited

U.S. PATENT DOCUMENTS

| | | |
|---|---|---|
| 2009/0198657 A1 | 8/2009 | Hattori |
| 2012/0143922 A1 | 6/2012 | Rane et al. |
| 2013/0041875 A1* | 2/2013 | Kan .................... G06F 3/067 707/705 |
| 2013/0332729 A1 | 12/2013 | Ito et al. |
| 2015/0039903 A1* | 2/2015 | Cash .................... G06F 16/951 713/189 |

FOREIGN PATENT DOCUMENTS

| | | |
|---|---|---|
| JP | 5442161 B2 | 3/2014 |
| JP | 2014-98989 A | 5/2014 |
| JP | 2014-98990 A | 5/2014 |
| JP | 2015-170057 A | 9/2015 |
| WO | WO 2012/115031 A1 | 8/2012 |
| WO | WO 2015/063905 A1 | 5/2015 |

* cited by examiner

Fig. 6

221: DATA STORAGE SECTION

| ENCRYPTED KEYWORD | | | ENCRYPTED DATA |
|---|---|---|---|
| FAMILY NAME | GENDER | AGE | |
| F (TAKAHASHI) | F (MALE) | F (3 1) | E (TARO TAKAHASHI, MALE, 31, ....) |
| F (SATO) | F (FEMALE) | F (4 1) | E (HANAKO SATO, FEMALE, 41, ....) |
| F (TANAKA) | F (MALE) | F (5 9) | E (TADASHI TANAKA, MALE, 59, ....) |
| F (SATO) | F (MALE) | F (2 6) | E (KAZUO SATO, MALE, 26, ....) |
| F (WATANABE) | F (FEMALE) | F (5 3) | E (RYOKO WATANABE, FEMALE, 53, ....) |
| .. | .. | .. | .. |

322, 422: REGISTRATION DESTINATION STORAGE SECTION

| DATA MANAGEMENT DEVICE ID | IP ADDRESS |
|---|---|
| A | X.X.X.X |
| B | Y.Y.Y.Y |

Fig. 10

521: DETERMINATION INFORMATION STORAGE SECTION

| KEYWORD (FAMILY NAME) | SELECTION PROBABILITY ||
|---|---|---|
| | A | B |
| SATO | 0.4 | 0.6 |
| SUZUKI | 0.7 | 0.3 |
| TAKAHASHI | 0.2 | 0.8 |
| ·· | ·· | ·· |
| ·· | ·· | ·· |
| FAMILY NAMES OTHER THAN THE ABOVE | 0.5 | 0.5 |

Fig. 14

521: DETERMINATION INFORMATION STORAGE SECTION

| KEYWORD (FAMILY NAME) | SELECTION PROBABILITY | |
|---|---|---|
| | A | B |
| SATO | 0.4 | 0.6 |
| SUZUKI | 0.7 | 0.3 |
| TAKAHASHI | 0.2 | 0.8 |
| : | : | : |
| FAMILY NAMES OTHER THAN THE ABOVE | 0.5 | 0.5 |

| KEYWORD (GENDER) | SELECTION PROBABILITY | |
|---|---|---|
| | A | B |
| MALE | 0.6 | 0.4 |
| FEMALE | 0.3 | 0.7 |

REGISTRATION DESTINATION DETERMINATION DEVICE, SEARCHABLE ENCRYPTION SYSTEM, DESTINATION DETERMINATION METHOD, AND COMPUTER READABLE MEDIUM

TECHNICAL FIELD

The present invention relates to a data registration technology for preventing frequency analysis attacks.

BACKGROUND ART

There is a searchable encryption system in which a retrieval device can retrieve data managed by a data management device by designating a keyword, and, at that time, keeps secret of the data and the keyword from the data management device.

The searchable encryption system is expected to be applied to outsourcing of confidential data management and filtering of encrypted mail in a mail data management device. In the searchable encryption system, the technology for achieving various security requirements and various technologies for reducing the storage usage, communication overhead, and calculation overhead of the data management device and the retrieval device are studied.

The searchable encryption can roughly be classified into a scheme based on deterministic encryption and a scheme based on probabilistic encryption.

In searchable encryption based on deterministic encryption, the same keyword becomes the same encrypted keyword. Therefore, the data management device can perform retrieval by merely performing a binary match determination based on a specified encrypted keyword. Consequently, the searchable encryption based on deterministic encryption has a merit of being able to speed up using an existing retrieval technology.

However, in the searchable encryption based on deterministic encryption, frequency information of keywords appears as frequency information of encrypted keywords as it is. Consequently, the searchable encryption based on deterministic encryption has a demerit of enabling an attack called "frequency analysis" that the data management device estimates the corresponding keyword by checking the frequency of the encrypted keyword.

Patent Literature 1 describes a searchable encryption scheme based on deterministic encryption in which measures are taken against frequency analysis attacks.

On the other hand, in searchable encryption based on probabilistic encryption, different encrypted keywords are generated from the same keyword. Therefore, in the searchable encryption based on probabilistic encryption, there is a merit that security is high because even if the data management device examines the frequency of encrypted keywords, it is not possible to estimate the keyword.

However, in the searchable encryption based on probabilistic encryption, special calculation that is not a binary match determination is required for matching of an encrypted keyword and a retrieval request (trapdoor). Further, in the searchable encryption based on probabilistic encryption, it is not possible to speed up using an existing retrieval technology. Consequently, the searchable encryption based on probabilistic encryption has a demerit that the time required for retrieval is longer than the deterministic encryption based scheme.

Non-Patent Literature 1 describes a searchable encryption scheme based on probabilistic encryption.

In the scheme described in Patent Literature 1 and the scheme described in Non-Patent Literature 1, the frequency of keywords is unknown when the data management device merely refers to encrypted keywords, but when the searchable encryption system is actually operated and the retrieval is performed, the frequency of the keywords hit in the retrieval is known. Therefore, there is a problem that when the system is operated for a long time, much of the frequency information is leaked to the data management device, and finally a frequency analysis attack by the data management device becomes possible.

Patent Literatures 2 and 3 describe schemes in which a hit ratio is changed by transmitting a condition wider than a retrieval condition specified by a searcher to the data management device as a retrieval request, and arrangements are also made to make hit ratios uniform. This makes it difficult for the data management device to estimate a keyword.

CITATION LIST

Patent Literature

Patent Literature 1: WO 2012/115031
Patent Literature 2: JP 2014-98989 A
Patent Literature 3: JP 2014-98990 A

Non-Patent Literature

Non-Patent Literature 1: D. Boneh, G. D. Crescenzo, R. Ostrovsky, and G. Persiano, "Public key encryption with keyword search", EUROCRYPT 2004, LNCS 3027, pp. 506-522, Interlaken, Switzerland, May 2004.

SUMMARY OF INVENTION

Technical Problem

In the schemes described in Patent Literatures 2 and 3, since a condition wider than a retrieval condition specified by a searcher is transmitted as a retrieval request to a data management device, even data that the searcher does not need is transmitted as a retrieval result, resulting in communication overhead. In addition, since it is necessary to make the hit ratio uniform, there is also a restriction that the appearance frequency distribution of each keyword has to be known beforehand.

An object of the present invention is to make estimation of registration data by a data management device difficult with a simple configuration.

Solution to Problem

A registration destination determination device according to the present invention includes:
a registration destination determination section to determine which data management device, among a plurality of data management devices, is to manage registration data, such that, with a data type constituting the registration data as a target type, an appearance frequency distribution of values set for the target type of the registration data managed by each of the plurality of data management devices is different from an appearance frequency distribution of values set for the target type of the registration data managed by the plurality of data management devices.

Advantageous Effects of Invention

In the present invention, the appearance frequency distribution of values of registration data in each data management device is disturbed. Therefore, this makes it difficult for the data management device to estimate the registration data.

BRIEF DESCRIPTION OF DRAWINGS

FIG. 6 is a diagram illustrating data stored in a data storage section 221 according to the embodiment 1.
FIG. 10 is a diagram illustrating data stored in a determination information storage section 521 according to the embodiment 1.
FIG. 14 is a diagram illustrating data stored in a determination information storage section 521 according to a variation 3.

DESCRIPTION OF EMBODIMENTS

Embodiment 1

Description of the Configuration

Figure 1:
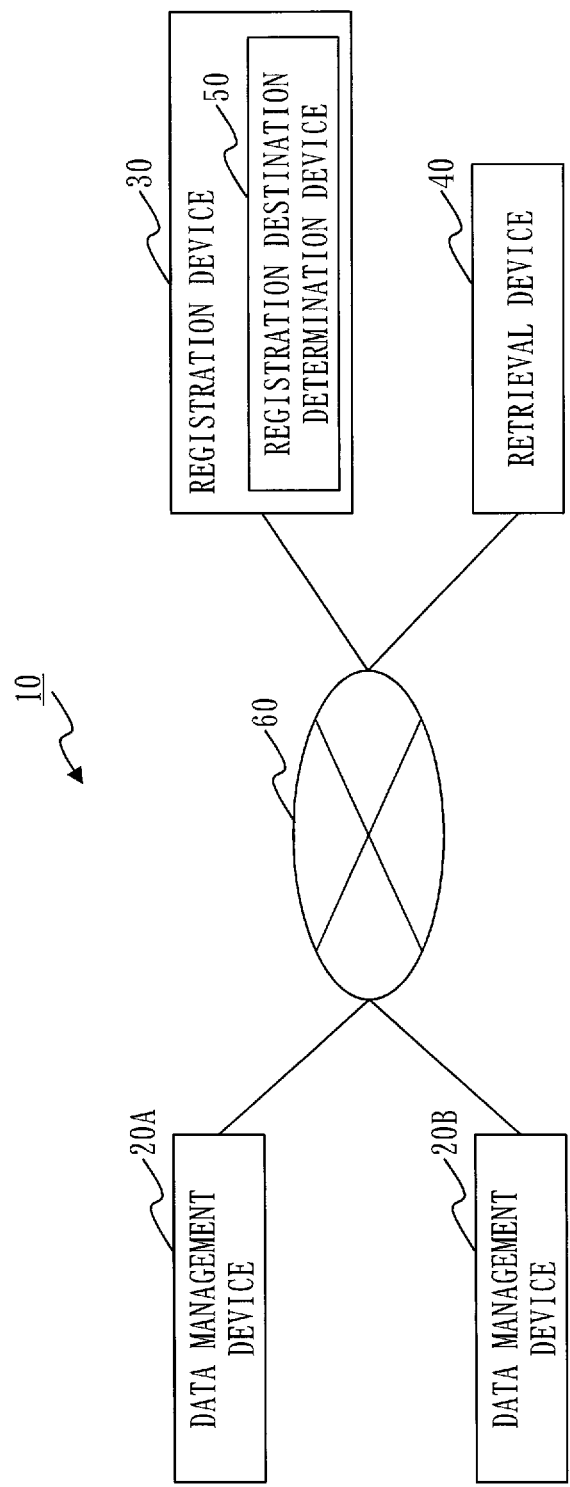
FIG. 1 is a configuration diagram of a searchable encryption system 10 according to an embodiment 1.

A configuration of a searchable encryption system 10 according to an embodiment 1 will be described with reference to FIG. 1.
The searchable encryption system 10 includes a plurality of data management devices 20, a registration device 30, and a retrieval device 40. The registration device 30 includes a registration destination determination device 50. Each of the data management devices 20, the registration device 30, and the retrieval device 40 are connected via a network 60.

Figure 3:
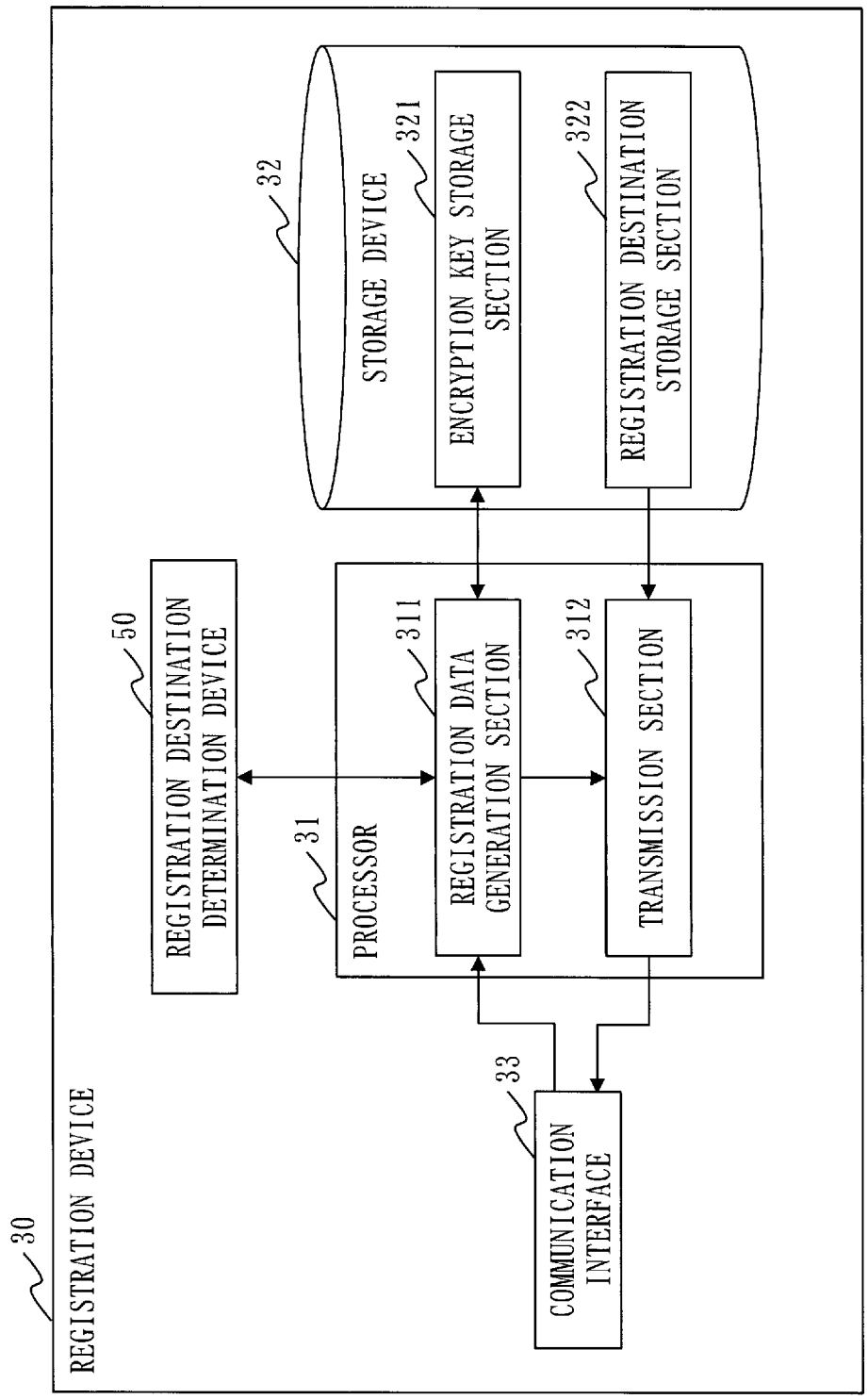
FIG. 3 is a configuration diagram of a registration device 30 according to the embodiment 1.
Figure 4:
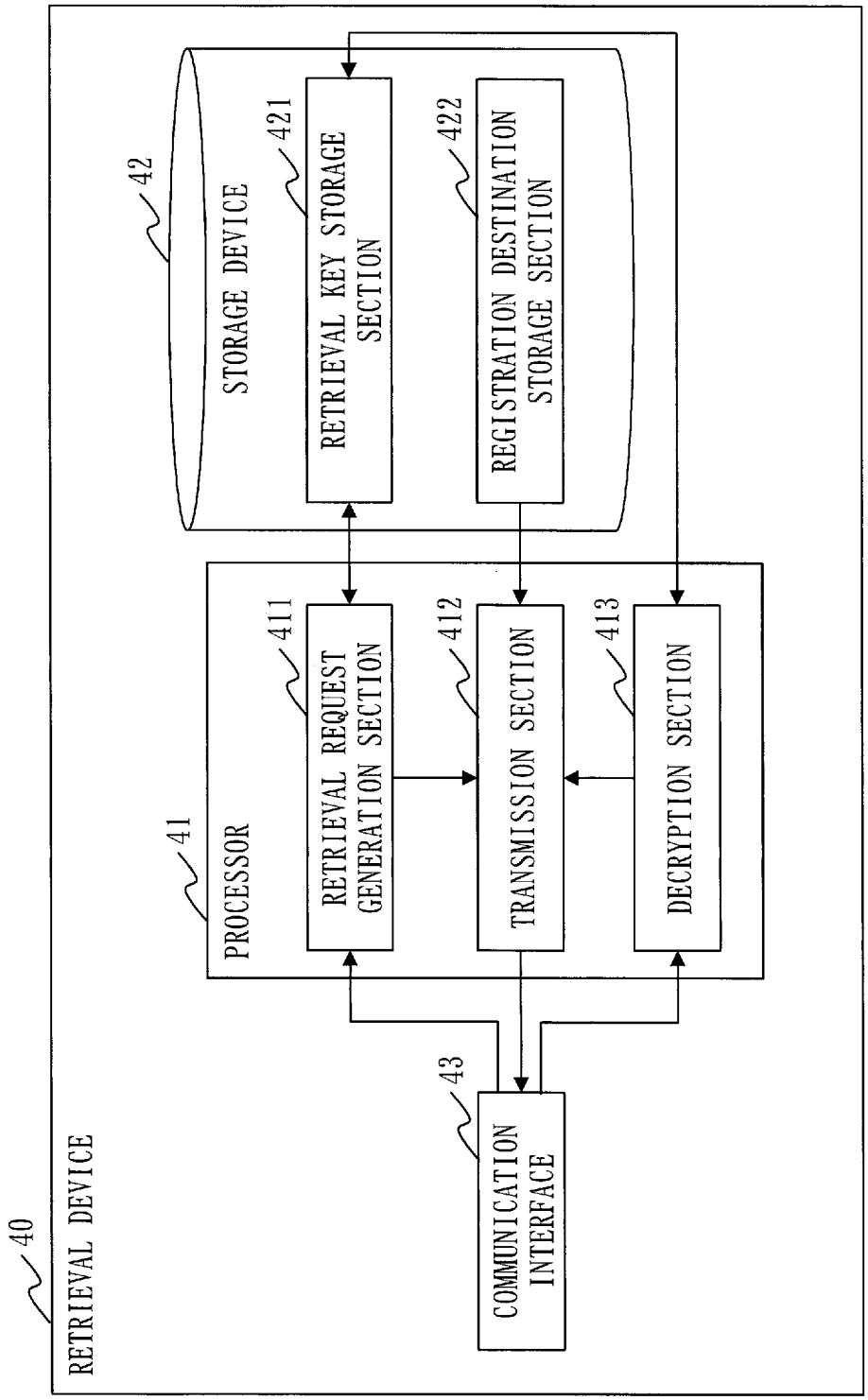
FIG. 4 is a configuration diagram of a retrieval device 40 according to the embodiment 1.

It is sufficient that two or more data management devices 20 are provided in the searchable encryption system 10. In the embodiment 1, as illustrated in FIG. 1, an example in which the searchable encryption system 10 includes two data management devices 20A and 20B as a plurality of data management devices 20 will be described.
The configuration of a data management device 20 according to the embodiment 1 will be described with reference to FIG. 2.
The data management device 20 is a computer.
The data management device 20 includes hardware of a processor 21, a storage device 22, and a communication interface 23. The processor 21 is connected to other hardware via a system bus, and controls the other hardware.
The data management device 20 includes a registration section 211 and a retrieval section 212 as functional components. The functions of the respective sections of the registration section 211 and the retrieval section 212 are realized by software.
In the storage device 22, the programs for realizing the functions of the respective sections in the data management device 20 are stored. The programs are read and executed by the processor 21. Further, the storage device 22 realizes the function of a data storage section 221.
The configuration of the registration device 30 according to the embodiment 1 will be described with reference to FIG. 3.
The registration device 30 is a computer.
The registration device 30 includes hardware of a processor 31, a storage device 32, and a communication interface 33. The processor 31 is connected to other hardware via a system bus, and controls the other hardware. Further, the registration device 30 includes the registration destination determination device 50.
The registration device 30 includes a registration data generation section 311 and a transmission section 312 as functional components. The functions of the respective sections of the registration data generation section 311 and the transmission section 312 are realized by software.
In the storage device 32, the programs for realizing the functions of the respective sections in the registration device 30 are stored. The programs are read and executed by the processor 31. Further, the storage device 32 realizes the functions of an encryption key storage section 321 and a registration destination storage section 322.
The configuration of the retrieval device 40 according to the embodiment 1 will be described with reference to FIG. 4.
The retrieval device 40 is a computer.
The retrieval device 40 includes hardware of a processor 41, a storage device 42, and a communication interface 43. The processor 41 is connected to other hardware via a system bus, and controls the other hardware.
The retrieval device 40 includes a retrieval request generation section 411, a transmission section 412, and a decryption section 413 as functional components. The functions of the respective sections of the retrieval request generation section 411, the transmission section 412, and the decryption section 413 are realized by software.
In the storage device 42, the programs for realizing the functions of the respective sections in the retrieval device 40 are stored. The programs are read and executed by the processor 41. Further, the storage device 42 realizes the functions of a retrieval key storage section 421 and a registration destination storage section 422.

Figure 5:
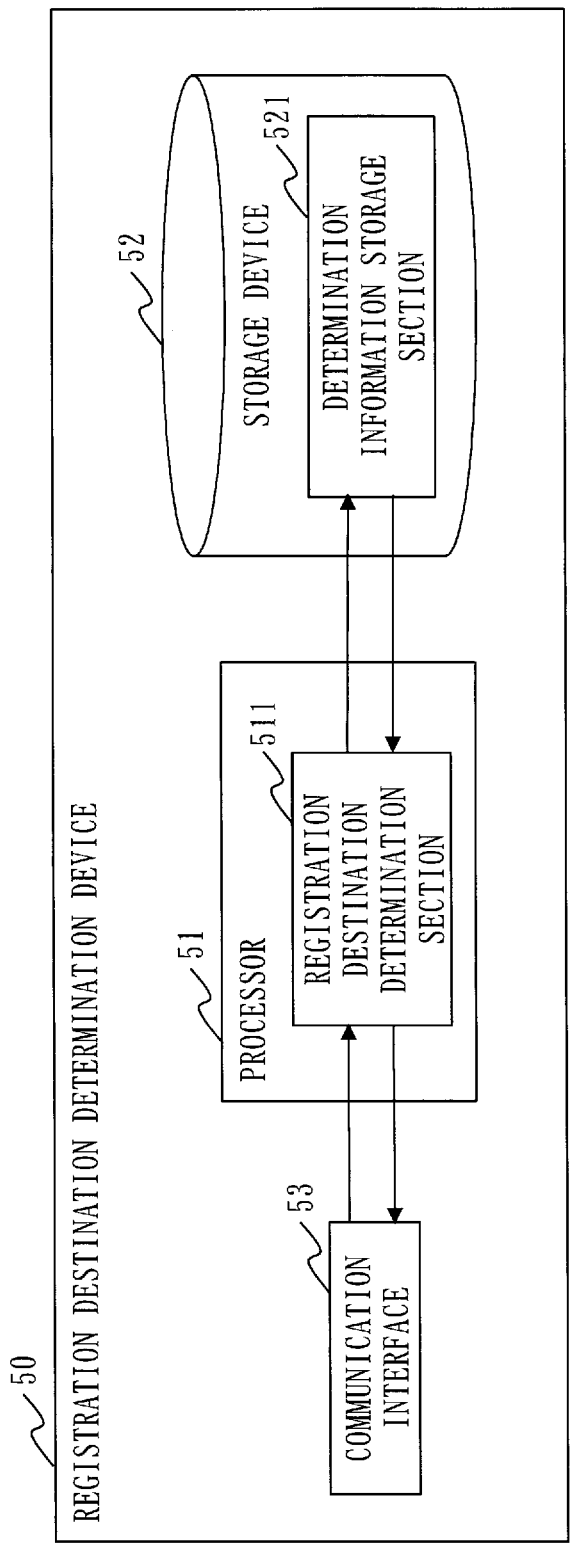
FIG. 5 is a configuration diagram of a registration destination determination device 50 according to the embodiment 1.

The configuration of the registration destination determination device 50 according to the embodiment 1 will be described with reference to FIG. 5.

The registration destination determination device 50 is a computer.

The registration destination determination device 50 includes hardware of a processor 51, a storage device 52, and a communication interface 53. The processor 51 is connected to other hardware via a system bus, and controls the other hardware.

The registration destination determination device 50 includes a registration destination determination section 511 as a functional component. The function of the registration destination determination section 511 is realized by software.

In the storage device 52, the program for realizing the function of the registration destination determination section 511 is stored. The program is read and executed by the processor 51. Further, the storage device 52 realizes the function of a determination information storage section 521.

It is noted that the registration device 30 and the registration destination determination device 50 are separate computers herein, but the registration device 30 and the registration destination determination device 50 may be implemented by integrating them in a single computer.

The processors 21, 31, 41, and 51 are integrated circuits (ICs) that perform processing. As specific examples, the processors 21, 31, 41, and 51 are a CPU, a digital signal processor (DSP), and a graphics processing unit (GPU).

The storage devices 22, 32, 42, and 52 each include a nonvolatile memory capable of keeping holding execution programs and data even while the power is off, and a volatile memory capable of moving data at high speed while power is on.

As a specific example, the nonvolatile memory is a hard disk drive (HDD), a solid state drive (SSD), and a flash memory. The nonvolatile memory may be a portable storage medium such as a Secure Digital (SD) memory card, a CompactFlash (CF), a NAND flash, a flexible disk, an optical disk, a compact disk, a Blu-ray (registered trademark) disk, or a DVD.

As a specific example, the volatile memory is a double data-rate 2 synchronous dynamic random access memory (DDR2-SDRAM), and a double data-rate 3 synchronous dynamic random access memory (DDR3-SDRAM).

The communication interfaces 23, 33, 43, and 53 are devices for communicating with other devices via the network 60. As a specific example, the communication interfaces 23, 33, 43, and 53 are terminals of Ethernet (registered trademark), RS 232 C, USB, and IEEE 1394.

Figure 2:
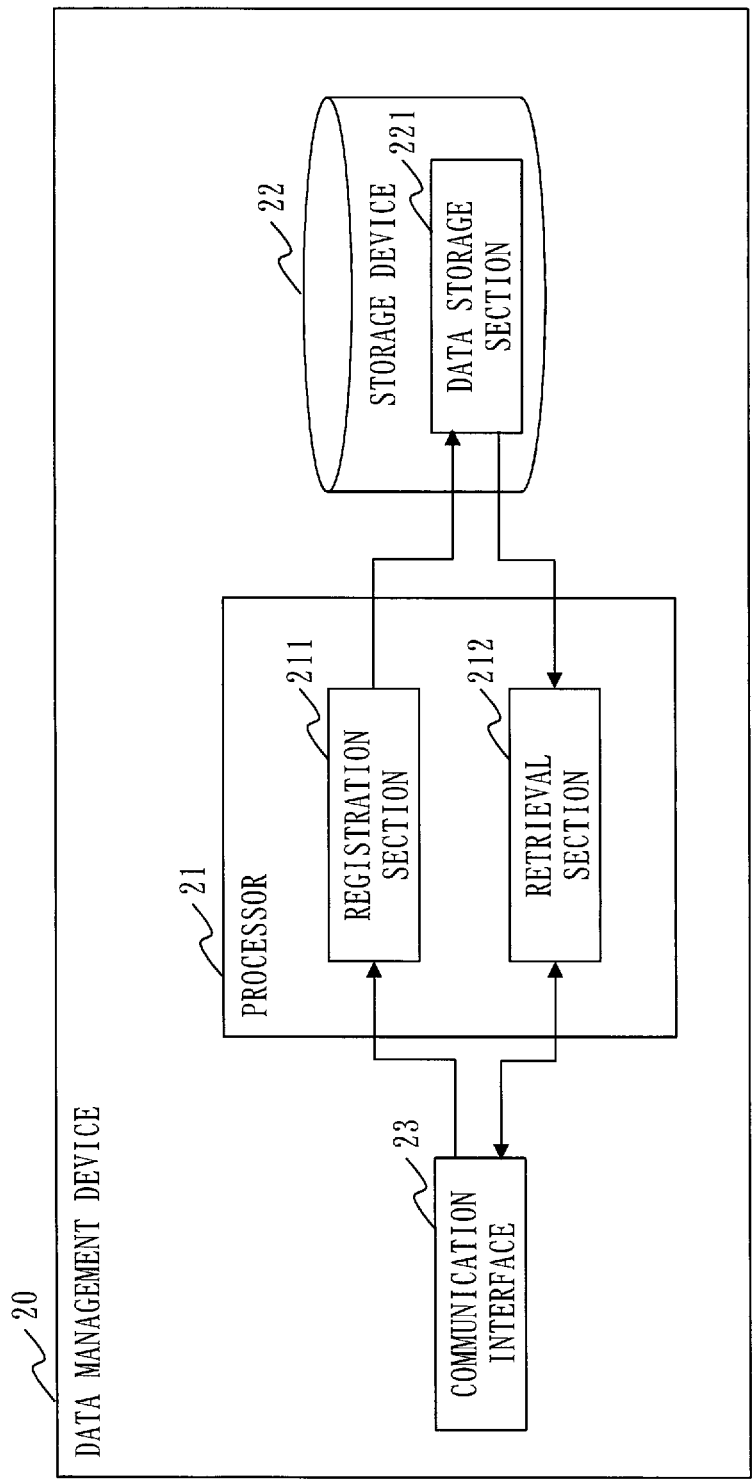
FIG. 2 is a configuration diagram of a data management device 20 according to the embodiment 1.

In FIG. 2, only one processor 21 is illustrated. However, the data management device 20 may include a plurality of processors that replace the processor 21. The plurality of processors share the execution of the programs for realizing the functions of the respective sections of the data management device 20. Like the processor 21, each processor is an IC that performs processing. Similarly, in FIGS. 3 to 5, only one processor 31, 41, 51 is illustrated. However, the registration device 30, the retrieval device 40, and the registration destination determination device 50 may each include a plurality of processors that replace the processors 31, 41, 51.

Description of Operation

The operation of the searchable encryption system 10 according to the embodiment 1 will be described with reference to FIGS. 6 to 13.

The operation of the searchable encryption system 10 according to the embodiment 1 corresponds to a searchable encryption method according to the embodiment 1. Further, the operation of the searchable encryption system 10 according to the embodiment 1 corresponds to the processing of a searchable encryption program according to the embodiment 1.

As the premise of the operation of the searchable encryption system 10, data stored in each storage section will be described.

Data stored in the data storage section 221 according to the embodiment 1 will be described with reference to FIG. 6.

In the data storage section 221, encrypted data obtained by encrypting data by the registration device 30 and an encrypted keyword generated for the searchable encryption by the registration device 30 are stored in association with each other.

In FIG. 6, the function F is a function for generating an encrypted keyword for the searchable encryption from a keyword, and the function E is a function for encrypting data. For example, as for the record of a first line, "Takahashi", "male", and "31" are encrypted for the searchable encryption and stored as keywords for retrieving encrypted data "Taro Takahashi, male, 31, . . . ". It is noted that, for ease of explanation, in FIG. 6, the data types "Family Name", "Gender", and "Age" are clearly stated, but they may be encrypted so as not to be known by the data management device 20.

Data stored in the encryption key storage section 321 according to the embodiment 1 will be described with reference to FIG. 7.

The encryption key storage section 321 stores a cryptographic key for generating encrypted data and a cryptographic key for generating an encrypted keyword. A cryptographic key for generating encrypted data is, as a specific example, a key of AES (Advanced Encryption Standard) or a public key of RSA. A cryptographic key for generating an encrypted keyword is, as a specific example, a cryptographic key of an existing searchable encryption technology described in Non-Patent Literature 1 or the like.

Figure 7:
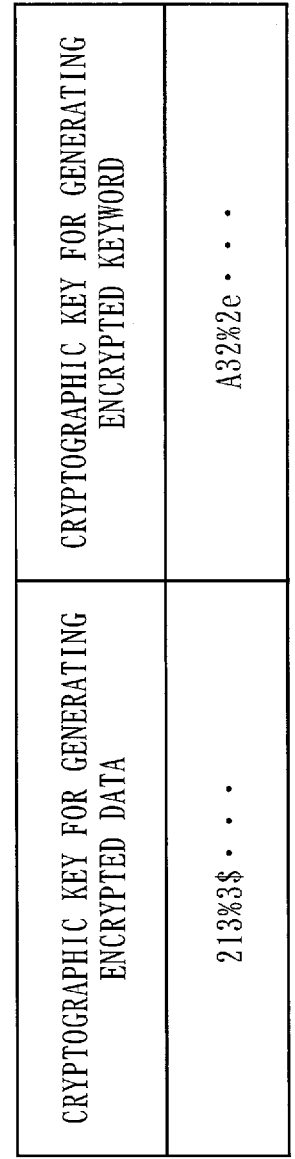
FIG. 7 is a diagram illustrating data stored in an encryption key storage section 321 according to the embodiment 1.

As illustrated in FIG. 7, the encryption key storage section 321 may store a cryptographic key for generating encrypted data and a cryptographic key for generating an encrypted keyword, which are common to all the data management devices 20, or may store a different cryptographic key for generating encrypted data and a different cryptographic key for generating an encrypted keyword, for each of the data management devices 20.

Data stored in the registration destination storage section 322 and the registration destination storage section 422 according to the embodiment 1 will be described with reference to FIG. 8.

The registration destination storage section 322 and the registration destination storage section 422 store information for specifying each data management device 20. In FIG. 8, the registration destination storage section 322 and the registration destination storage section 422 store the IP address of each data management device 20.

Data stored in the retrieval key storage section 421 according to the embodiment 1 will be described with reference to FIG. 9.

The retrieval key storage section 421 stores a cryptographic key for data decryption and a cryptographic key for generating a trapdoor which is a retrieval request. As a specific example, the cryptographic key for data decryption is a key of AES or a private key of RSA. As a specific example, the cryptographic key for generating a trapdoor is a cryptographic key for generating a trapdoor according to the existing searchable encryption technology described in Non-Patent Literature 1 or the like.

The cryptographic key for data decryption and the cryptographic key for generating encrypted data stored in the encryption key storage section 321 are corresponding keys. Further, the cryptographic key for generating a trapdoor and the cryptographic key for generating an encrypted keyword stored in the encryption key storage section 321 are corresponding keys. Therefore, when the encryption key storage section 321 stores a different cryptographic key for generating encrypted data and a different cryptographic key for generating an encrypted keyword for each data management device 20, the retrieval key storage section 421 also stores a different cryptographic key for data decryption and a different cryptographic key for generating a trapdoor for each data management device 20.

Data stored in the determination information storage section 521 according to the embodiment 1 will be described with reference to FIG. 10.

The determination information storage section 521 stores a selection probability of selecting each of the plurality of data management devices 20 for each value set for data type for which the appearance frequency distribution is desired to be disturbed, that is, for each keyword, in order to prevent frequency analysis attacks. FIG. 10 illustrates that, in the case of disturbing the appearance frequency distribution of family names, data for which the retrieval keyword is "Sato" is registered in the data management device 20A having the data management device ID "A" with a probability of 0.4, and in the data management device 20B having the data management device ID "B" with a probability of 0.6. Further, the bottom record represents that family names that do not exist in FIG. 10 are registered in each data management device 20 with a probability of 0.5. The bottom record is provided because enumerating all the family names is not realistic. For data types in which the types of values to be set are small such as gender and blood type, the selection probabilities may be stored for all the values.

Based on the data stored in each storage section described above, the operation of the searchable encryption system 10 according to the embodiment 1 will be described. The operation of the searchable encryption system 10 according to the embodiment 1 is roughly classified into three processes of (1) initial setting processing, (2) data registration processing, and (3) data retrieval processing.

It is noted that, in the following, an example of disturbing the appearance frequency distribution of family names in each data management device 20 will be described. That is, an example of making it difficult for each data management device 20 to estimate family names will be described.

Figure 11:
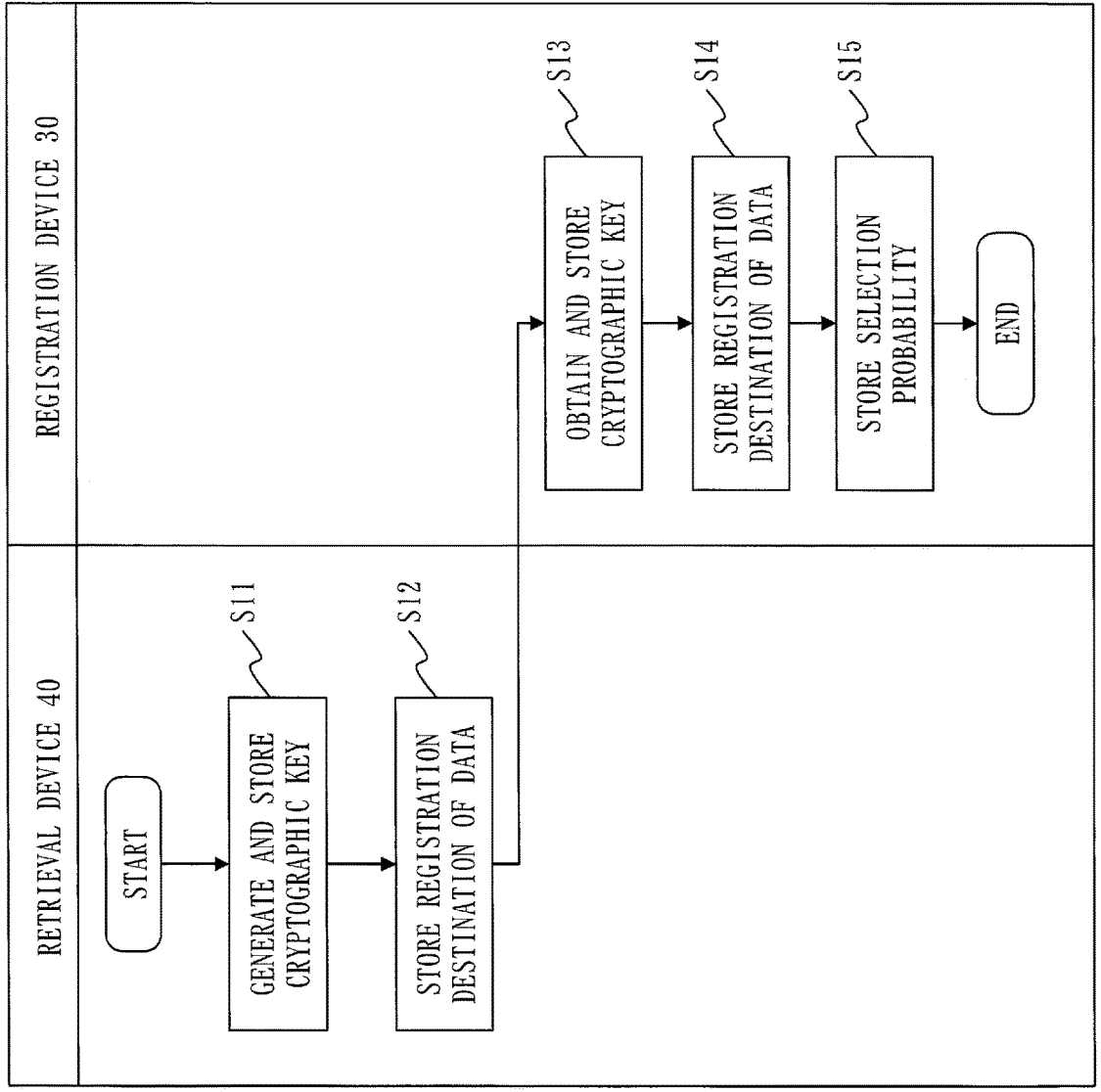
FIG. 11 is a flowchart of (1) initial setting processing according to the embodiment 1.

(1) Initial setting processing according to the embodiment 1 will be described with reference to FIG. 11.

In the initial setting processing, the initial setting of the entire searchable encryption system 10 is performed.

(Step S11: Retrieval Key Storage Processing)

The decryption section 413 of the retrieval device 40 generates a pair of a cryptographic key for data decryption and a cryptographic key for generating encrypted data, and writes the cryptographic key for data decryption into the retrieval key storage section 421. The transmission section 412 discloses the cryptographic key for generating encrypted data corresponding to the cryptographic key for data decryption, or transmits it to the registration device 30.

Further, the retrieval request generation section 411 of the retrieval device 40 generates a pair of a cryptographic key for generating a trapdoor and a cryptographic key for generating an encrypted keyword, and writes the cryptographic key for generating a trapdoor into the retrieval key storage section 421. The transmission section 412 discloses the cryptographic key for generating the encrypted keyword corresponding to the cryptographic key for generating a trapdoor, or transmits it to the registration device 30.

Figure 9:
FIG. 9 is a diagram illustrating data stored in a retrieval key storage section 421 according to the embodiment 1.

As a result, as illustrated in FIG. 9, the cryptographic key for data decryption and the cryptographic key for generating a trapdoor are stored in the retrieval key storage section 421.

It is noted that the decryption section 413 may obtain a pair of a cryptographic key for data decryption and a cryptographic key for generating encrypted data, which are externally generated, instead of generating them. Similarly, the retrieval request generation section 411 may obtain a pair of a cryptographic key for generating a trapdoor and a cryptographic key for generating an encrypted keyword, which are externally generated, instead of generating them.

(Step S12: Registration Destination Storage Processing)

The transmission section 412 of the retrieval device 40 writes information for specifying each data management device 20 into the registration destination storage section 422. As a specific example, the transmission section 412 obtains the IP address of each data management device 20 via the communication interface 43, and writes it into the registration destination storage section 422.

Figure 8:
FIG. 8 is a diagram illustrating data stored in a registration destination storage section 322 and a registration destination storage section 422 according to the embodiment 1.

As a result, as illustrated in FIG. 8, information for specifying each data management device 20 is stored in the registration destination storage section 422.

(Step S13: Cryptographic Key Storage Processing)

The registration data generation section 311 of the registration device 30 obtains the cryptographic key for generating encrypted data and the cryptographic key for generating an encrypted keyword that are disclosed or transmitted in step S11, and writes them into the encryption key storage section 321.

As a result, as illustrated in FIG. 7, the cryptographic key for generating encrypted data and the cryptographic key for generating a cryptographic keyword are stored in the encryption key storage section 321.

(Step S14: Registration Destination Storage Processing)

The transmission section 312 of the registration device 30 writes information for specifying each data management device 20 into the registration destination storage section 322. As a specific example, the transmission section 312 obtains the IP address of each data management device 20 via the communication interface 33, and writes it in the registration destination storage section 322. Here, the same information as the information written into the registration destination storage section 422 in step S12 is written into the registration destination storage section 322.

As a result, as illustrated in FIG. 8, information for specifying each data management device 20 is stored in the registration destination storage section 322.

(Step S15: Determination Information Storage Processing)

The registration destination determination section 511 of the registration destination determination device 50 sets a selection probability for each value set for target type with at least some of the data types constituting the registration data as target types, and writes it into the determination information storage section 521. For example, in order to disturb the appearance frequency distribution of family names, the registration destination determination section 511 sets a selection probability of selecting each data management device 20 as a registration destination when registering data in which a family name is a keyword in the data management device 20, and writes it into the determination information storage section 521, for each family name.

As a specific example, the registration destination determination section 511 accepts from a user the input of the selection probability for each value set for target type, and writes the accepted selection probability into the determination information storage section 521. Alternatively, the registration destination determination section 511 may set a selection probability at random for each value set for target type, and write it into the determination information storage section 521. The point here is to set a different selection probability for each value to be set.

As a result, as illustrated in FIG. 10, a selection probability is stored for each value set for target type in the determination information storage section 521.

Figure 12:
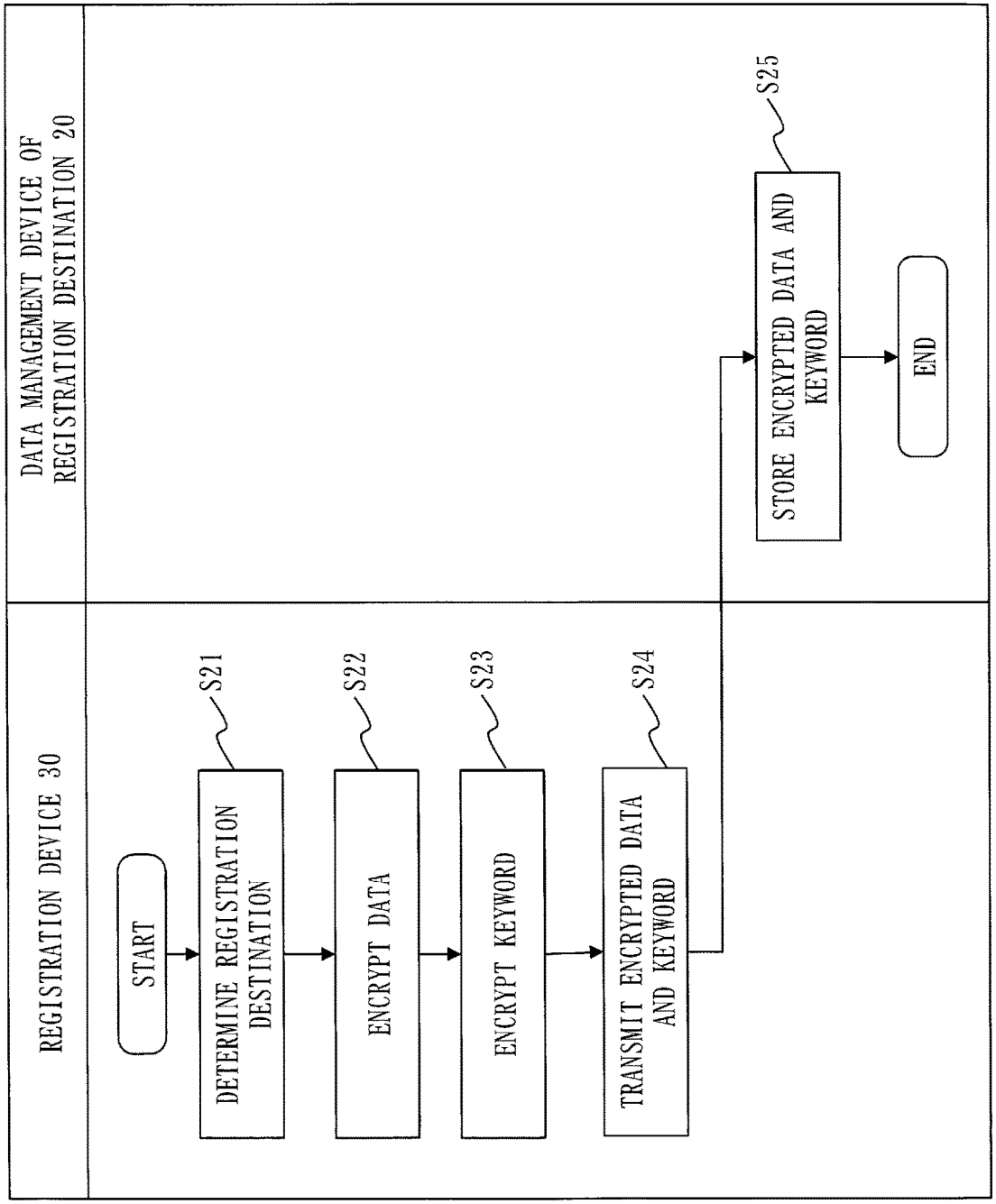
FIG. 12 is a flowchart of (2) data registration processing according to the embodiment 1.

(2) Data registration processing according to the embodiment 1 will be described with reference to FIG. 12.

The data registration processing is processing in which a data management device 20 of the registration destination is determined for each data to be registered, and the encrypted keyword and the encrypted data are stored in the data management device 20 determined.

Here, an example will be described in which data "Taro Takahashi, male, 31, . . . " is registered so that searchable encryption can be performed with keywords of the family name "Takahashi", the gender "male" and the age "31".

(Step S21: Registration Destination Determination Processing)

With respect to a keyword, that is, a value, for which the appearance frequency distribution is desired to be disturbed, the registration destination determination section 511 of the registration destination determination device 50 refers to the selection probability stored in the determination information storage section 521 to determine the registration destination.

In this case, the registration destination determination section 511 obtains the selection probability with respect to the family name "Takahashi" which is a keyword since the appearance frequency distribution of family names is desired to be disturbed. When the selection probabilities illustrated in FIG. 10 are stored in the determination information storage section 521, the data is distributed to the data management device 20A with a probability of 0.2 and is distributed to the data management device 20B with a probability of 0.8. The registration destination determination section 511 determines a data management device 20 of the registration destination based on the obtained selection probability. Here, it is assumed that the data management device 20B is determined as the registration destination.

(Step S22: Data Encryption Processing)

The registration data generation section 311 of the registration device 30 encrypts data to generate encrypted data using the cryptographic key for generating encrypted data stored in the encryption key storage section 321. It is noted that when a different cryptographic key is stored for each data management device 20 in the encryption key storage section 321, the registration data generation section 311 uses the cryptographic key corresponding to the data management device 20 of the registration destination.

Here, the registration data generation section 311 encrypts the data "Taro Takahashi, male, 31, . . . " to generate encrypted data E (Taro Takahashi, male, 31, . . . ).

(Step S23: Keyword Encryption Processing)

The registration data generation section 311 of the registration device 30 encrypts a keyword to generate an encrypted keyword using the cryptographic key for generating an encrypted keyword stored in the encryption key storage section 321. It is noted that when a different cryptographic key is stored for each data management device 20 in the encryption key storage section 321, the registration data generation section 311 uses the cryptographic key corresponding to the data management device 20 of the registration destination.

Here, the registration data generation section 311 encrypts "Takahashi", "male", and "31" as keywords to generate F (Takahashi), F (male), and F (31) as encrypted keywords. It is noted that a cryptographic key for generating an encrypted keyword may differ for each data type such as family name, gender and age, or may be the same for all the data types. When a cryptographic key differs for each data type, the registration data generation section 311 uses the corresponding cryptographic key for data type.

(Step S24: Data Transmission Processing)

The transmission section 312 of the registration device 30 reads information for specifying the data management device 20 of the registration destination determined in step S21 from the registration destination storage section 322. Then, according to the read information, the transmission section 312 transmits the encrypted data generated in step S22 and the encrypted keyword generated in step S23 to the data management device 20 of the registration destination.

When the information illustrated in FIG. 8 is stored in the registration destination storage section 322, the IP address "Y.Y.Y.Y" of the data management device 20B is read out in this case. Then, the transmission section 312 transmits the encrypted data and the encrypted keyword to the data management device 20B according to the IP address "Y.Y.Y.Y".

(Step S25: Data Storage Processing)

The registration section 211 of the data management device 20 of the registration destination writes the encrypted data and the encrypted keyword transmitted in step S24 into the data storage section 221.

Here, the data illustrated in the first line of FIG. 6 is written into the data storage section 221.

Figure 13:
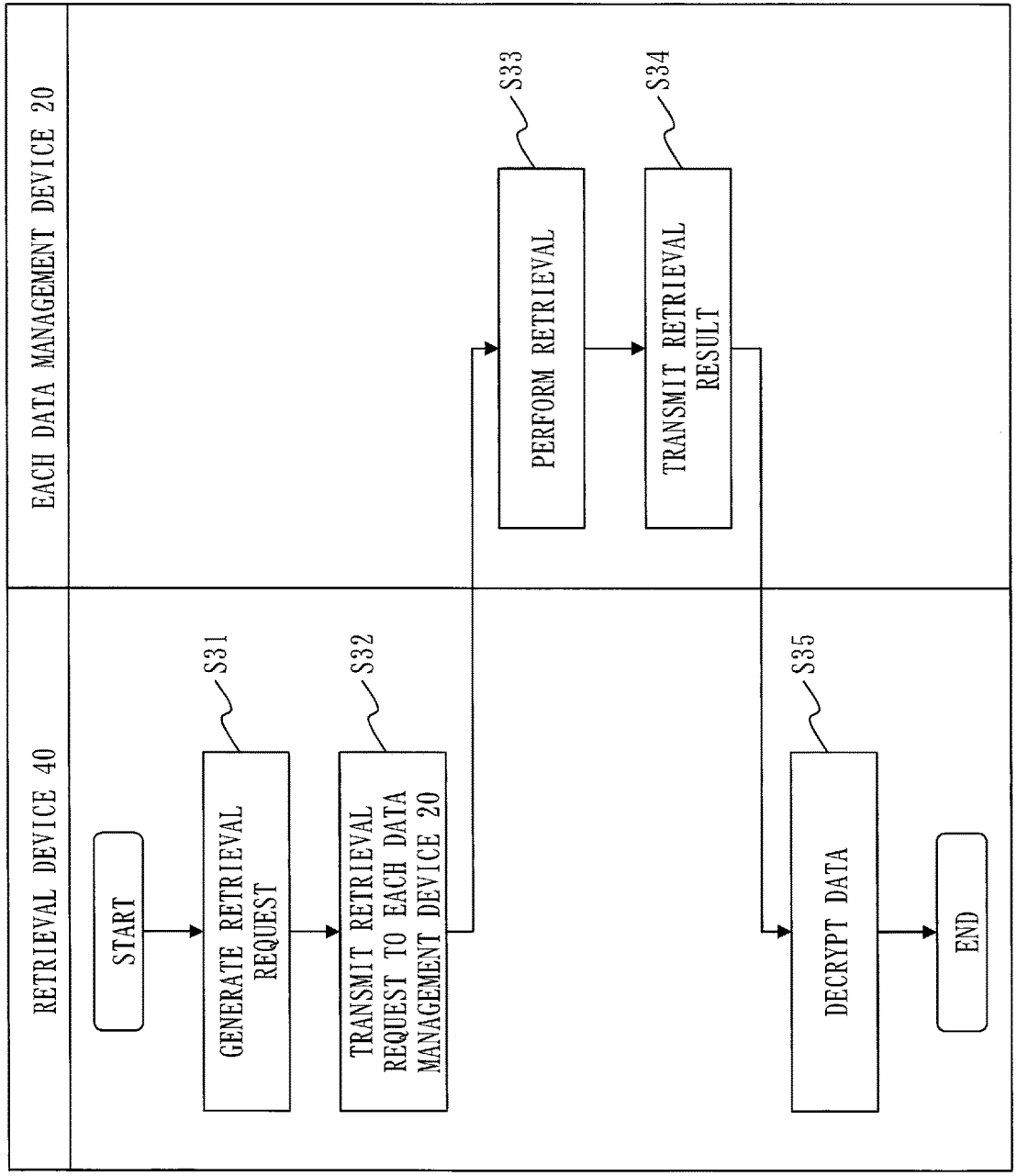
FIG. 13 is a flowchart of (3) data retrieval processing according to the embodiment 1.
Figure 15:
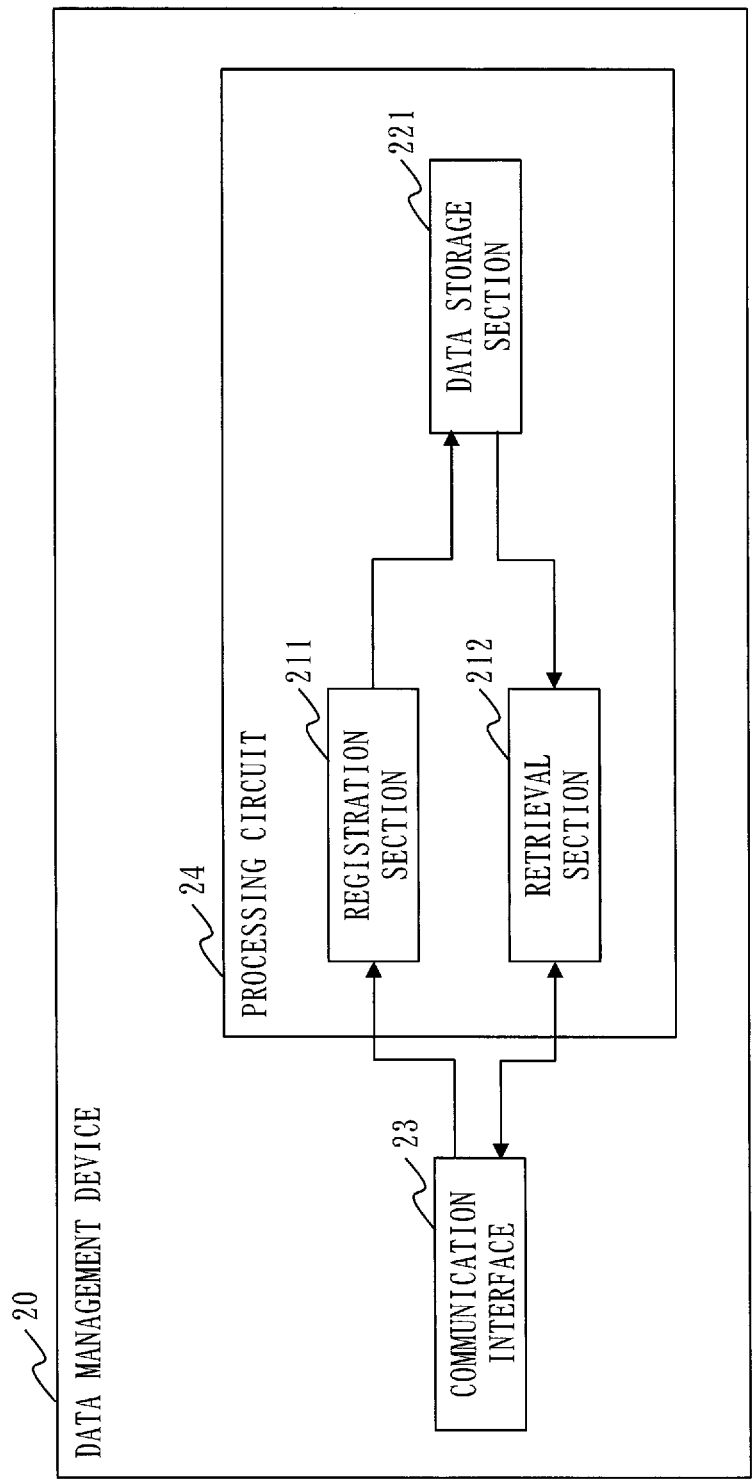
FIG. 15 is a configuration diagram of a data management device 20 according to a variation 8.
Figure 16:
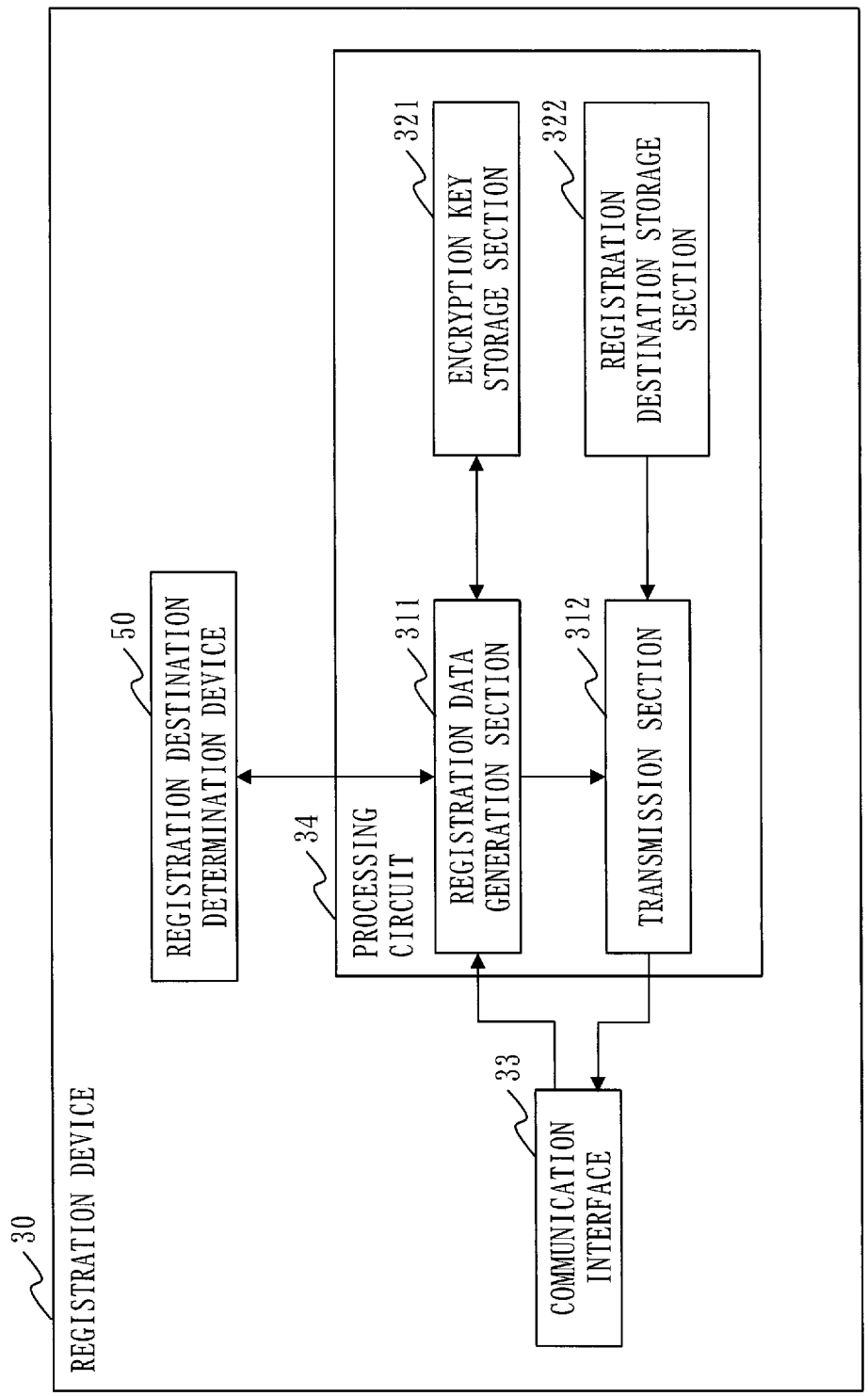
FIG. 16 is a configuration diagram of a registration device 30 according to the variation 8.
Figure 17:
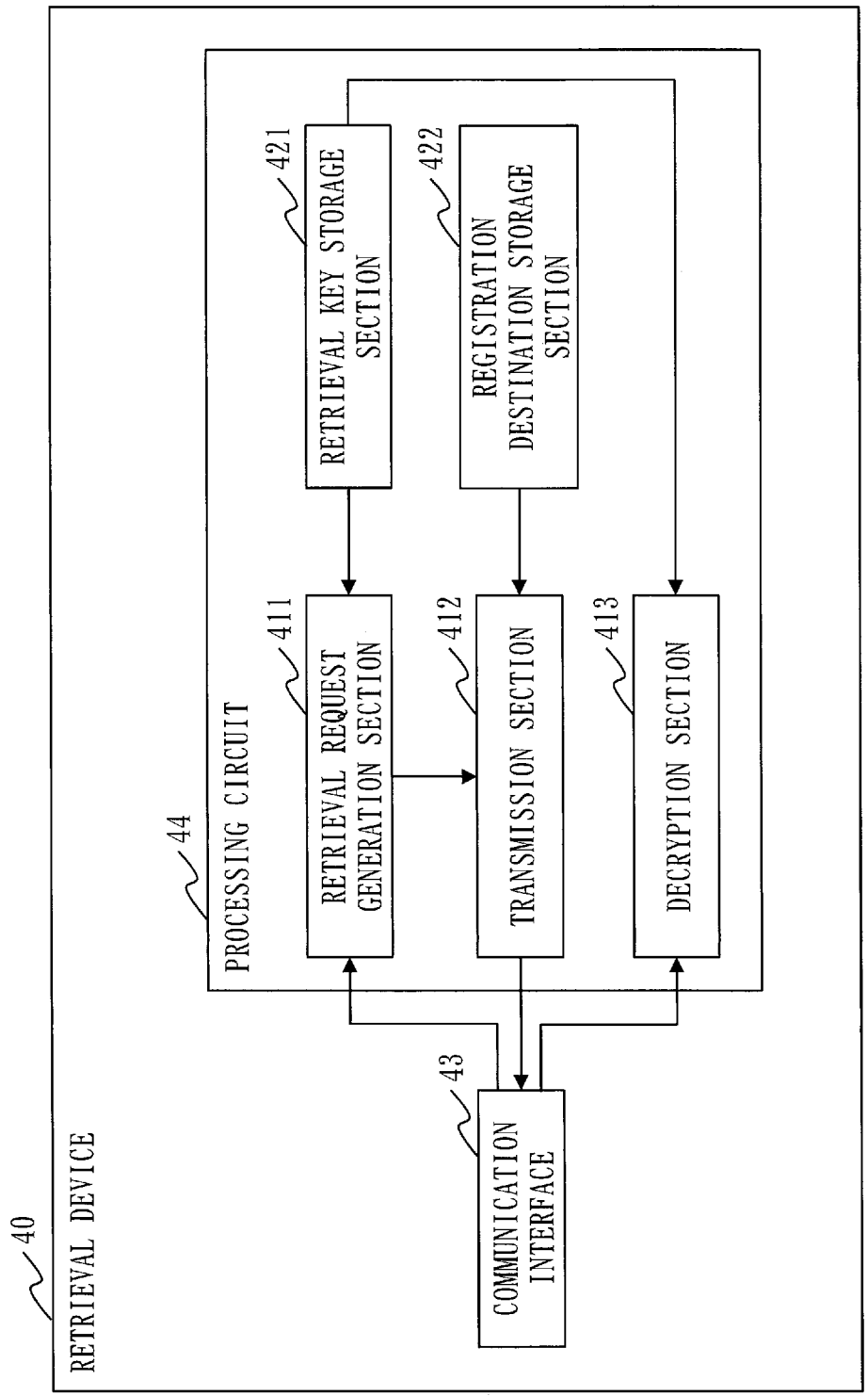
FIG. 17 is a configuration diagram of a retrieval device 40 according to the variation 8.
Figure 18:
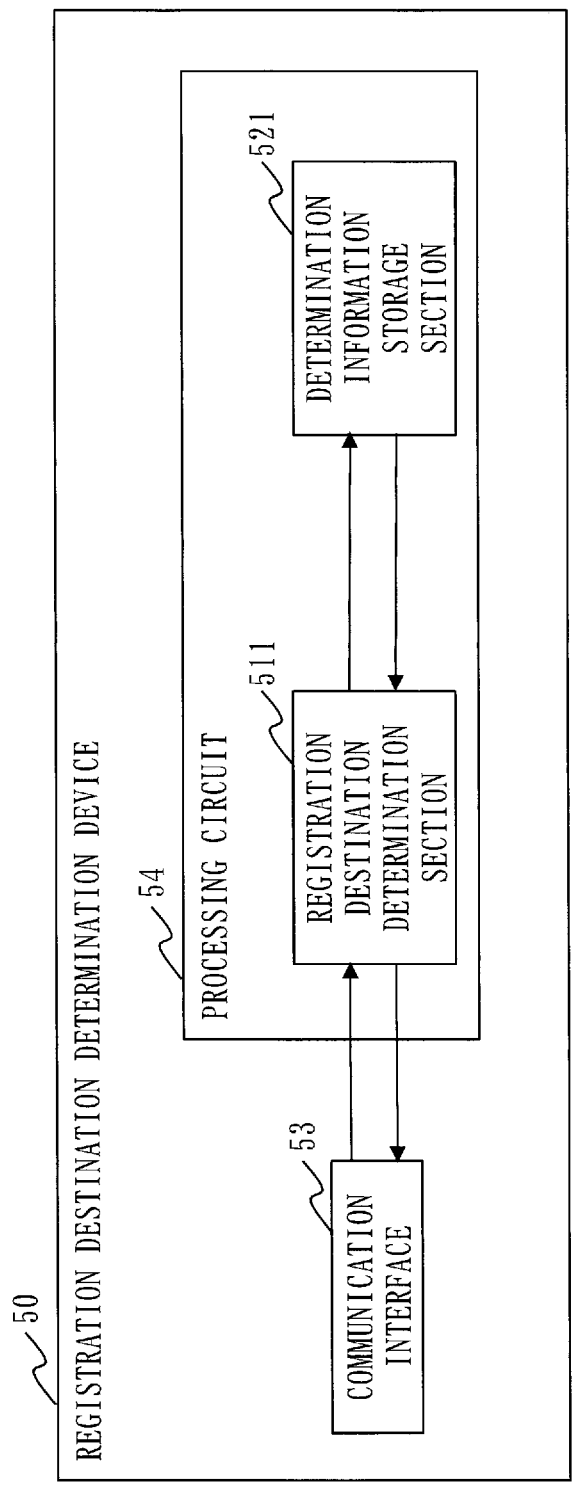
FIG. 18 is a configuration diagram of a registration destination determination device 50 according to the variation 8.

(3) Data retrieval processing according to the embodiment 1 will be described with reference to FIG. 13.

The data retrieval processing is processing in which a keyword is specified and a searchable encryption is performed on data stored in each data management device 20.

(Step S31: Request Generation Processing)

The retrieval request generation section 411 of the retrieval device 40 accepts the input of a keyword. Then, the retrieval request generation section 411 encrypts the accepted keyword to generate a retrieval request using the cryptographic key for generating a trapdoor stored in the retrieval key storage section 421. It is noted that when a different cryptographic key is stored for each data management device 20 in the retrieval key storage section 421, the retrieval request generation section 411 uses each cryptographic key to generate a retrieval request corresponding to each data management device 20.

Here, the retrieval request generation section 411 accepts the family name "Takahashi" as a keyword. Then, the retrieval request generation section 411 generates T (Takahashi) using the cryptographic key for generating a trapdoor. T is a trapdoor generation function. When an cryptographic key differs for each data type, the retrieval request generation section 411 uses the corresponding cryptographic key for data type.

(Step S32: Request Transmission Processing)

The transmission section 412 of the retrieval device 40 transmits the retrieval request generated in step S31 to each data management device 20. It is noted that when a different cryptographic key is stored for each data management device 20 in the retrieval key storage section 421, a retrieval request generated using the corresponding cryptographic key is transmitted to the data management device 20.

(Step S33: Retrieval Processing)

The retrieval section 212 of each data management device 20 performs retrieval on the data stored in the data storage section 221 in accordance with the retrieval request transmitted in step S32. As a specific example, the retrieval section 212 executes the existing searchable encryption processing described in Non-Patent Literature 1.

Here, as a result of performing retrieval using T (Takahashi), E (Taro Takahashi, male, 31, . . . ) illustrated in the first line of FIG. 6 hits.

(Step S34: Result Transmission Processing)

The retrieval section 212 of each data management device 20 transmits the data hit in step S33 to the retrieval device 40.

Here, E (Taro Takahashi, male, 31, . . . ) illustrated in the first line of FIG. 6 is transmitted.

(Step S35: Decryption Processing)

The decryption section 413 of the retrieval device 40 decrypts the data transmitted in step S34 using the cryptographic key for data decryption stored in the retrieval key storage section 421. It is noted that when a different cryptographic key is stored for each data management device 20 in the retrieval key storage section 421, decryption is performed using the cryptographic key corresponding to the data management device 20 of the data transmission source.

Here, E (Taro Takahashi, male, 31, . . . ) is decrypted, and data of Taro Takahashi, male, 31, . . . is obtained.

Effects of Embodiment 1

As described above, in the searchable encryption system 10 according to the embodiment 1, the appearance frequency distribution of values of registration data in each data management device is disturbed. Therefore, this makes it difficult for the data management device to estimate the registration data.

Specifically, in the (2) data registration processing, each data management device 20 is selected with different probability for each value. As a result, the original appearance frequency distribution of values and the appearance frequency distribution of values in each data management device 20 are different.

For example, if the original appearance frequency distribution of family names is "Sato" 1.6%, "Suzuki" 1.4%, and "Takahashi" 1.2%, for the data for which the keyword is "Sato", 0.64% (=1.6%×0.4) of the total is registered in the data management device 20A. Similarly, for "Suzuki", 0.98% (=1.4%×0.7) of the total is registered, and for "Takahashi", 0.24% (=1.2%×0.2) of the total is registered. Therefore, assuming that the total amount of registration data in each data management device 20 is equal, the appearance frequency distribution of family names in the data management device 20A is 1.28% for "Sato", 1.96% for "Suzuki", and "0.48% for Takahashi, representing the distribution different from the original distribution.

Therefore, even if the data management device 20 can observe these frequencies (1.28%, 1.96%, 0.48%, . . . ) because of long-term operation of the searchable encryption system 10 and the like, it cannot estimate keywords correctly, thus, security against frequency analysis attacks is maintained. It is noted that, also with regard to the data management device 20B, the appearance frequency distribution of family names is 1.92% for "Sato", 0.84% for "Suzuki", and 1.92% for "Takahashi", and the security against frequency analysis attacks is maintained.

Furthermore, in the searchable encryption system 10 according to the embodiment 1, unnecessary data is not transmitted and received, and there is no communication overhead.

Furthermore, in the searchable encryption system 10 according to the embodiment 1, security can be achieved even if the appearance frequency distribution of keywords is unknown. That is, security can be achieved even in a situation where a user does not know the appearance frequency distribution and only an attacker knows it.

Other Configurations

<Variation 1>

In the embodiment 1, an existing searchable encryption technology is used for generating an encrypted keyword and generating a retrieval request. However, as a variation 1, instead of the existing searchable encryption technology, a deterministic encryption such as an AES or a keyed hash function such as a hash-based message authentication code (HMAC) may be used.

When an encrypted keyword is deterministically generated using the AES or the HMAC, a registration destination may be determined from the encrypted keyword, instead of determining it from a keyword by the registration destination determination device 50. This eliminates the need for the registration destination determination device 50 to handle unencrypted data and keywords. As a result, it is also possible to have a system configuration in which the registration destination determination device 50 is independent from the registration device 30, and the registration destination determination device 50 is managed by a third party other than a registrant and a searcher.

<Variation 2>

In the embodiment 1, a selection probability is stored for each value in the determination information storage section 521. However, as a variation 2, for each value, the selection probability for one data management device 20 may be set to 1, and the selection probability for another data management device 20 may be set to 0. As a result, a specific value is necessarily stored in a specific data management device 20. Storing the selection probability also in the retrieval device 40 can limit a data management device 20 to which the retrieval device 40 transmits a retrieval request in data retrieval processing.

<Variation 3>

In the embodiment 1, the case of disturbing the appearance frequency distribution of one data type is described. However, as a variation 3, the appearance frequency distribution may be disturbed for a plurality of data types. For example, in the embodiment 1, only the appearance frequency distribution of family names is disturbed, but the appearance frequency distribution of family names and genders may be disturbed.

When the appearance frequency distribution is disturbed for a plurality of data types, as illustrated in FIG. 14, it is necessary to store the selection probability for each data type in the determination information storage section 521. Then, the registration destination determination section 511 may randomly select a target data type for which the appearance frequency distribution is disturbed, and determine a registration destination based on the selection probability for the selected data type. When the selection probabilities illustrated in FIG. 14 are stored in the determination information storage section 521, for example, the registration destination determination section 511 randomly selects a family name and a gender with a probability of 0.5, respectively.

<Variation 4>

In the embodiment 1, the encrypted data and the encrypted keyword are collectively stored in the data storage section 221. However, as a variation 4, the encrypted data and the encrypted keyword may be associated with each other, for example, by interposing a data ID, and the encrypted data and the encrypted keyword may be separately stored. In particular, the encrypted data and the encrypted keyword may be stored in different devices.

<Variation 5>

In the embodiment 1, the registration device 30 and the retrieval device 40 are separate devices. However, as a variation 5, when only an information searcher can register information, the registration device 30 and the retrieval device 40 may be combined into a single device. In this case, it is unnecessary to disclose a cryptographic key for generating an encrypted keyword and a cryptographic key for generating encrypted data to the outside, thus, it is possible to operate the searchable encryption system without giving an attacker extra information.

<Variation 6>

In the embodiment 1, a cryptographic key is stored in the encryption key storage section 321 of the registration device 30 and the retrieval key storage section 421 of the retrieval device 40. However, as a variation 6, the cryptographic key may be obtained from the outside when necessary. For example, a cryptographic key may be obtained from an IC card, or may be automatically generated from a password or biometric information.

<Variation 7>

In the embodiment 1, only one registration device 30 and one retrieval device 40 are used. However, as a variation 7, data registration and retrieval may be performed, respectively, by using a plurality of registration devices 30 and a plurality of retrieval devices 40. In this case, by sharing a cryptographic key for generating a trapdoor among the plurality of retrieval devices 40, it is possible to obtain the same retrieval result even from a different device. On the other hand, if it is desirable to change a retrieval result for each device even with the same retrieval keyword, a cryptographic key for generating a trapdoor may be changed for each device.

<Variation 8>

In the embodiment 1, the functions of the respective sections of each device including the data management device 20, the registration device 30, the retrieval device 40, and the registration destination determination device 50 are realized by software. As a variation 8, the functions of the respective sections of each device may be realized by hardware. Differences between the variation 8 and the embodiment 1 will be described.

The configuration of each device according to the variation 8 will be described with reference to FIG. 15 to FIG. 18.

When the functions of the respective sections are realized by hardware, each device is provided with processing circuits 24, 34, 44, 54 instead of the processors 21, 31, 41, 51 and the storage devices 22, 32, 42, 52. The processing circuits 24, 34, 44, 54 are dedicated electronic circuits that realized the functions of the respective sections of each device and the function of the storage device 22.

The processing circuits 24, 34, 44, 54 may be a single circuit, a composite circuit, a programmed processor, a parallel programmed processor, a logic IC, a GA (Gate Array), an ASIC (Application Specific Integrated Circuit), an FPGA (Field-Programmable Gate Array) is assumed.

Each device may include a plurality of processing circuits that replace the processing circuits 24, 34, 44, 54. By the plurality of processing circuits, the functions of respective sections are realized as a whole. Like the processing circuits 24, 34, 44, 54, each processing circuit is a dedicated electronic circuit.

<Variation 9>

As a variation 9, some functions may be realized by hardware, and other functions may be realized by software. That is, among respective sections of each device, some functions may be realized by hardware, and other functions may be realized by software.

The processors 21, 31, 41, 51, the storage devices 22, 32, 42, 52 and the processing circuits 24, 34, 44, 54 are collectively referred to as "processing circuitry". That is, the functions of respective sections are realized by the processing circuitry.

<Variation 10>

In the embodiment 1, protection of communication between devices is not mentioned. However, as a variation 10, communication may be protected using an existing encryption technology such as TLS (Transport Layer Security).

Embodiment 2

An embodiment 2 is different from the embodiment 1 in that a selection probability is calculated at the time when the value of the data type for which the appearance frequency distribution is desired to be disturbed is designated. In the embodiment 2, the different point will be described.

Description of Operation

Figure 19:
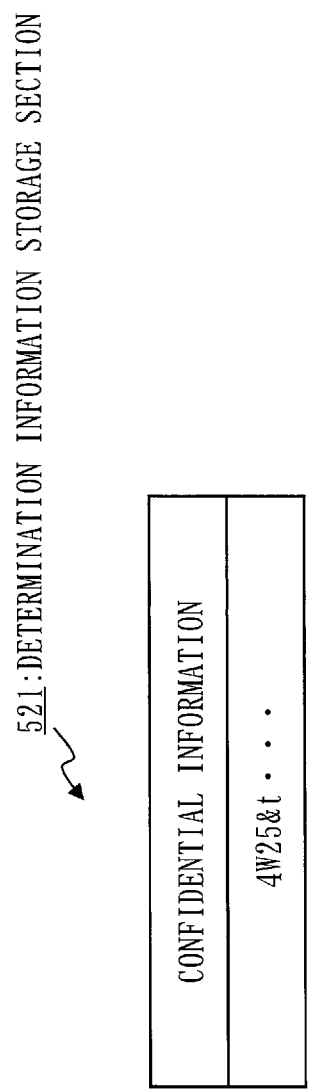
FIG. 19 is a diagram illustrating data stored in a determination information storage section 521 according to an embodiment 2.

The operation of the searchable encryption system 10 according to the embodiment 2 will be described with reference to FIG. 19, and FIG. 11 to FIG. 12.

The operation of the searchable encryption system 10 according to the embodiment 2 corresponds to a searchable encryption method according to the embodiment 2. The operation of the searchable encryption system 10 according to the embodiment 2 corresponds to the processing of a searchable encryption program according to the embodiment 2.

Data stored in the determination information storage section 521 according to the embodiment 2 will be described with reference to FIG. 19.

The determination information storage section 521 stores confidential information for deterministically deriving a selection probability from each value. As a specific example, the determination information storage section 521 stores an HMAC key. Confidential information other than the HMAC key may be stored if a different selection probability can be deterministically derived for each value.

(1) Initial setting processing according to the embodiment 2 will be described with reference to FIG. 11.

The processing from step S11 to step S14 is the same as in the embodiment 1.

(Step S15: Determination Information Storage Processing)

The registration destination determination section 511 of the registration destination determination device 50 writes confidential information for deterministically deriving a selection probability into the determination information storage section 521. In the embodiment 2, the registration destination determination section 511 writes the HMAC key into the determination information storage section 521.

(2) Data registration processing according to the embodiment 2 will be described with reference to FIG. 12.

The processing from step S22 to step S25 is the same as in the embodiment 1.

(Step S21: Registration Destination Determination Processing)

The registration destination determination section 511 of the registration destination determination device 50 calculates a selection probability from a keyword, that is, a value, for which the appearance frequency distribution is desired to be disturbed, and the confidential information stored in the determination information storage section 521. Then, the registration destination determination section 511 refers to the calculated selection probability to determine the registration destination.

In the embodiment 2, the registration destination determination section 511 calculates a hash value from the keyword and the HMAC key. Then, the registration destination determination section 511 sets the value obtained by normalizing the calculated hash value to a value between 0 and 1 or less as the selection probability for the data management device 20A. Further, the registration destination determination section 511 sets the value obtained by subtracting the selection probability for the data management device 20A from 1 as the selection probability for the data management device 20B.

Effects of Embodiment 2

As described above, in the searchable encryption system 10 according to the embodiment 2, the selection probability is calculated when data is stored. Therefore, it is unnecessary to prepare the selection probability for each value beforehand.

In the case where keywords can be set freely at the time of data registration, in the case where a wide variety of values are possible even when the values of the keywords are limited and the like, it is difficult to prepare the selection probability for each value beforehand. Even in such a case, the searchable encryption system 10 according to the embodiment 2 can realize secure searchable encryption.

In addition, in the searchable encryption system 10 according to the embodiment 2, it is sufficient to store confidential information such as an HMAC key in the determination information storage section 521. Thus, the amount of data stored in the determination information storage section 521 can be reduced.

Other Configurations

<Variation 11>

In the embodiment 2, the selection probability is directly calculated from the hash value in step S21. However, as a variation 11, a hash value may be given as a random number seed of a probabilistic algorithm that calculates a selection probability stochastically, so that the selection probability may be deterministically calculated from the hash value.

REFERENCE SIGNS LIST

10: searchable encryption system, 20: data management device, 21: processor, 22: storage device, 23: communication interface, 24: processing circuit, 211: registration section, 212: retrieval section, 221: data storage section, 30: registration device, 31: processor, 32: storage device, 33: communication interface, 34: processing circuit, 311: registration data generation section, 312: transmission section, 321: encryption key storage section, 322: registration destination storage section, 40: retrieval device, 41: processor, 42: storage device, 43: communication interface, 44: processing circuit, 411: retrieval request generation section, 412: transmission section, 413: decryption section, 421: retrieval key storage section, 422: registration destination storage section, 50: registration destination determination device, 51: processor, 52: storage device, 53: communication interface, 54: processing circuit, 511: registration destination determination section, 521: determination information storage section, 60: network.

The invention claimed is:

1. A registration destination determination device for a searchable encryption system configured to make estimation of registration data in a data management device more difficult, the searchable encryption system including at least a registration device, a retrieval device, and a plurality of data management devices connected via a network, where the plurality of data management devices store encrypted data encrypted by the registration device and encrypted keywords generated for searchable encryption by the registration device in association with each other, the registration destination determination device comprising:

processing circuitry to:
determine a selection probability for each data management device, among the plurality of data management devices, the selection probability corresponding to a probability that a corresponding data management device is to manage registration data for a corresponding target type, the selection probability for each data management device being set such that an appearance frequency distribution of values for a specific target type of registration data managed by each of the plurality of data management devices is different from an original appearance frequency distribution of values for the specific target type of registration data managed by the encryption system;
store the determined selection probability for each of the plurality of data management devices for each value set for the specific target type;
select which data management device is to manage data to be registered according to the stored selection probability;
encrypt the data to be registered using an encryption key associated with the selected data management device; and
transmit the encrypted day and keyword to the selected data management device.

2. A registration destination determination device for a searchable encryption system configured to make estimation of registration data in a data management device more difficult, the searchable encryption system including at least a registration device, a retrieval device, and a plurality of data management devices connected via a network, where the plurality of data management devices store encrypted data encrypted by the registration device and encrypted keywords generated for searchable encryption by the registration device in association with each other, the registration destination determination device, the registration destination determination device comprising:

processing circuitry configured to
calculate a selection probability for each data management device, among the plurality of data management devices, the selection probability corresponding to a probability that a corresponding data management device is to manage registration data for a corresponding target type, the selection probability for each data management device being set such that an appearance frequency distribution of values for a specific target type of registration data managed by each of the plurality of data management devices is different from an original appearance frequency distribution of values for the specific target type of registration data managed by the encryption system, wherein the selection probability is calculated from the registration data and confidential information, select a data management device according to the calculated selection probability, encrypt the data to be registered using an encryption key associated with the selected data management device, and transmit the encrypted day and keyword to the selected data management device.

3. The registration destination determination device according to claim 1, wherein the data to be registered is a keyword for searchable encryption.

4. The registration destination determination device according to claim 2, wherein the data to be registered is a keyword for searchable encryption.

5. A searchable encryption system configured to make estimation of registration data in a data management device more difficult, comprising:

a plurality of data management devices;

a retrieval device to transmit a retrieval request to the plurality of data management devices so as to specify a keyword corresponding to the transmitted retrieval request; and the registration destination determination device comprising:

processing circuitry to:

determine a selection probability for each data management device, among the plurality of data management devices, the selection probability corresponding to a probability that a corresponding data management device is to manage registration data for a corresponding target type, the selection probability for each data management device being set such that an appearance frequency distribution of values for a specific target type of registration data managed by each of the plurality of data management devices is different from an original appearance frequency distribution of values for the specific target type of registration data managed by the encryption system;

store the determined selection probability for each of the plurality of data management devices for each value set for the specific target type;

select which data management device is to manage data to be registered according to the stored selection probability;

encrypt the data to be registered using an encryption key associated with the selected data management device; and transmit the encrypted day and keyword to the selected data management device.

6. A searchable encryption system configured to make estimation of registration data in a data management device more difficult, comprising:

a plurality of data management devices;

a retrieval device to transmit a retrieval request to the plurality of data management devices so as to specify a keyword corresponding to the transmitted retrieval request; and a registration destination determination device comprising:

processing circuitry configured to calculate a selection probability for each data management device, among the plurality of data management devices, the selection probability corresponding to a probability that a corresponding data management device is to manage registration data for a corresponding target type, the selection probability for each data management device being set such that an appearance frequency distribution of values for a specific target type of registration data managed by each of the plurality of data management devices is different from an original appearance frequency distribution of values for the specific target type of registration data managed by the encryption system, wherein the selection probability is calculated from the registration data and confidential information, select a data management device according to the calculated selection probability, encrypt the data to be registered using an encryption key associated with the selected data management device, and transmit the encrypted day and keyword to the selected data management device.

7. A registration destination determination method for making estimation of registration data in a data management device more difficult in a searchable encryption system, the searchable encryption system including at least a registration device, a retrieval device, and a plurality of data management devices connected via a network, where the plurality of data management devices store encrypted data encrypted by the registration device and encrypted keywords generated for searchable encryption by the registration device in association with each other, the method comprising:

determining a selection probability for each data management device, among the plurality of data management devices, the selection probability corresponding to a probability that a corresponding data management device is to manage registration data for a corresponding target type, the selection probability for each data management device being set such that an appearance frequency distribution of values for a specific target type of registration data managed by each of the plurality of data management devices is different from an original appearance frequency distribution of values for the specific target type of registration data managed by encryption system, storing the selection probability for each value for the specific target type, selecting which data management device is to manage data to be registered according to the stored selection probability, encrypting the data to be registered using an encryption key associated with the selected data management device; and transmitting the encrypted day and keyword to the selected data management device.

8. A registration destination determination method for making estimation of registration data in a data management device more difficult in a searchable encryption system, the searchable encryption system including at least a registration device, a retrieval device, and a plurality of data management devices connected via a network, where the plurality of data management devices store encrypted data encrypted by the registration device and encrypted keywords generated for searchable encryption by the registration device in association with each other, the method comprising:

calculating a selection probability for each data management device, among the plurality of data management devices, the selection probability corresponding to a probability that a corresponding data management device is to manage registration data for a corresponding target type, the selection probability for each data management device being set such that an appearance frequency distribution of values for a specific target type of registration data managed by each of the plurality of data management devices is different from an original appearance frequency distribution of values for the specific target type of registration data managed by the encryption system, wherein the selection probability is calculated from the registration data and confidential information, selecting a data management device according to the calculated selection probability, encrypting the data to be registered using an encryption key associated with the selected data management device, and transmitting the encrypted day and keyword to the selected data management device.

9. A non-transitory computer readable medium storing a registration destination determination program for making estimation of registration data in a data management device more difficult in a searchable encryption system, the searchable encryption system including at least a registration device, a retrieval device, and a plurality of data management devices connected via a network, where the plurality of data management devices store encrypted data encrypted by the registration device and encrypted keywords generated for searchable encryption by the registration device in association with each other, the program causing a computer to:

determine a selection probability for each data management device, among the plurality of data management devices, the selection probability corresponding to a probability that a corresponding data management device is to manage registration data for a corresponding target type, the selection probability for each data management device being set such that an appearance frequency distribution of values for a specific target type of registration data managed by each of the plurality of data management devices is different from an original appearance frequency distribution of values for the specific target type of registration data managed by the encryption system, storing the selection probability for each value set for the specific target type, select which data management device is to manage data to be registered according to the stored selection probability, encrypt the data to be registered using an encryption key associated with the selected data management device, and transmit the encrypted day and keyword to the selected data management device.

10. A non-transitory computer readable medium storing a registration destination determination program for making estimation of registration data in a data management device more difficult in a searchable encryption system, the searchable encryption system including at least a registration device, a retrieval device, and a plurality of data management devices connected via a network, where the plurality of data management devices store encrypted data encrypted by the registration device and encrypted keywords generated for searchable encryption by the registration device in association with each other, the program causing a computer to:

calculate a selection probability for each data management device, among the plurality of data management devices, the selection probability corresponding to a probability that a corresponding data management device is to manage registration data for a corresponding target type, the selection probability for each data management device being set such that an appearance frequency distribution of values for a specific target type of registration data managed by each of the plurality of data management devices is different from an original appearance frequency distribution of values for the specific target type of registration data managed by encryption system, wherein the selection probability is calculated from the registration data and confidential information, select a data management device according to the calculated selection probability, encrypt the data to be registered using an encryption key associated with the selected data management device, and transmit the encrypted day and keyword to the selected data management device.

\* \* \* \* \*